United States Patent [19]
Allain

[11] 3,823,492
[45] July 16, 1974

[54] COLOR KEYED EDUCATION APPARATUS

[76] Inventor: Althea S. Allain, 4232 Tumonville St., New Orleans, La. 70122

[22] Filed: July 3, 1972

[21] Appl. No.: 268,845

[52] U.S. Cl................................ 35/35 J, 35/71
[51] Int. Cl....................... G09b 1/32, G09b 17/00
[58] Field of Search......... 35/35 R, 35 H, 35 J, 7 A, 35/48 A, 71

[56] References Cited
UNITED STATES PATENTS

| | | | |
|---|---|---|---|
| 1,673,166 | 6/1928 | Studebaker | 35/48 A X |
| 1,788,715 | 1/1931 | Hall | 35/7 R |
| 1,812,077 | 6/1931 | Belash | 35/35 R X |
| 3,235,976 | 2/1966 | Elliott et al. | 35/35 J |
| 3,389,480 | 6/1968 | Holland | 35/35 J |
| 3,482,333 | 12/1969 | Trager | 35/35 J |
| 3,618,231 | 11/1971 | Nason | 35/35 J |
| 3,680,229 | 8/1972 | Serrie et al. | 35/35 R |

FOREIGN PATENTS OR APPLICATIONS

| | | | |
|---|---|---|---|
| 1,159,120 | 7/1969 | Great Britain | 35/35 H |
| 141,053 | 3/1921 | Great Britain | 35/35 H |

Primary Examiner—Wm. H. Grieb
Attorney, Agent, or Firm—Pugh & Laiche

[57] ABSTRACT

A color keyed or coded education system or kit for teaching a sight vocabulary of functional words including: color cards on which the functional words are color keyed by underlining or by color printing of the word itself, the color cards being of three types, word, phrase, and sentence cards; correlated readers whose covers are colored in correlation with the color of the words of the color cards which are included in the particular reader involved; color coded individual progress charts; and color coded tests whose color designation again is correlated with the color of the words of the color cards which are included in the particular test. The correlating colors of the correlating kit are red, orange, yellow, blue, green, purple and brown, the first six of which are repeated in sets in order to use only those colors which children in big city schools are familiar. Seven color discs and crayons identical to the colors used in the kit are included for use in teaching initial color concepts when necessary. All elements of the kit are thus color coded or keyed together.

5 Claims, 5 Drawing Figures

PATENTED JUL 16 1974  3,823,492

COLOR KEYED EDUCATION APPARATUS

BACKGROUND OF THE INVENTION

The present invention relates to a color keyed education system for teaching a sight vocabulary of functional words to beginning readers, or to any child who is experiencing difficulties in learning to read. This vocabulary is acquired through visual and auditory perception, meaningful word associations, reinforcement and practice with the vocabulary.

The great debate over beginning reading instruction still rages. Educators disagree on program philosophy, methods, how and when to introduce reading skills, etc., to beginning readers. Throughout the heated debates, however, there is one concept on which most experts agree: that the child's acquisition of a sight vocabulary is fundamental and essential to his attainment of subsequent reading skills.

Knowledge of sight words seems to be the sacred ground which is revered and respected by reading experts whether they belong to the comprehension camp, the linguistic camp, the phonics camp, or the alphabet reformers' camp.

Since this sight vocabulary is the initial step in the reading process, it is evident that the place to begin is here.

It was with the above tenet in mind that the present invention was developed.

The present invention has been used and tested over the last four years and has accomplished exciting goals.

Teachers have used this kit and they are excited. In the opinion of the inventor, a teacher, the possibilities for the present invention are tremendous.

The present invention is an outgrowth of classroom instruction. The idea was formulated five years ago to help children with overwhelming reading problems. During this period it has been tested and refined to its present form.

Teaching reading to children with severe reading problems is an extremely difficult task as they have not progressed from the first rung of the ladder of sequential steps in the reading process. Such children need basic words, not all at once, but in measured doses to supplement their basic reading program. They need words which are presented early and used frequently in popular basic texts. Colors are a good way of differentiating these words, thus, the concept of various color levels evolved.

The functional words contained in the present invention were obtained through independent study of the leading basal texts at the primary level. A word count was taken from the word lists in these texts. The 260 words presented in the present invention are the words which this count yielded.

Many of the functional words are words which research in reading shows that children should recognize instantly for greater fluency and comprehension in the reading process.

Thus, the present invention is directed to a combination of interrelated or correlated structural elements for teaching a sight vocabulary of functional words to beginning readers, or to any individual who is experiencing difficulties in learning to read. This vocabulary is acquired through visual and auditory perception, meaningful word associations, reinforcement, and practice with the vocabulary.

The major task of the present invention is to help each child increase his stockpile of basic words so that he recognizes them instantly. For a child who has never read before, or for the child who has known few successes in reading, the ready recognition of words, however few they may be, will be intrisically rewarding and self-reinforcing for him.

When reference is made to "A Sight Vocabulary of Functional Words" reference is being made to those words which appear earliest and are most frequently used in basal texts which are presently in use throughout the United States. These words are found in beginning reading texts and make up a large percent of reading material throughout the grades.

Most of the functional words are unphoenetic and can only be learned by sight. Many of them, however, can be decoded easily but, because of their frequent use, ready recognition of them would aid considerably in the fluency of the reading process.

The present invention is not, nor does it pretend to be, a complete reading program. It is a device to be used with any basic reading program being used in the schools.

The present invention was primarily designed for the teaching of a functional vocabulary of basic words. However, it can be used in many facets of the Language Arts Spectrum.

The present invention can be correlated with any basal reading text at the primary level since the functional words, for example the 260 functional words used in the preferred embodiment of the present invention, are high frequency words found in all good primary readers.

For First Graders, the skills to be acquired through use of the present invention are:
  Speech development;
  Opportunities for conversation;
  Training in left-to-right awareness;
  Development of return eye sweep;
  Auditory and visual discrimination;
  Likenesses and differences in words; and
  Mastery of Section A.

For Second and Third Graders, the skills to be acquired through use of the present invention are:
  All of the above skills for First Graders;
  Comprehension of phrase and sentence;
  Recognition of function of periods, commas, question marks, and capital letters; and
  Mastery of art color levels used in the present invention by completion of Third Grade.

For Remedial Reading Programs, the skills to be acquired through use of the present invention are:
  Individually-paced program to learn all skills; and
  Mastery of all color levels.

Likewise, for students beginning to learn English, the skills to be acquired through use of the present invention are:
  Individually-paced program to learn all skills; and
  Mastery of all color levels.

Likewise, for Adult Education Programs, the skills to be acquired through the use of the present invention are:
  Individually-paced program to learn all skills; and
  Mastery of all color levels.

BRIEF DESCRIPTION OF THE DRAWING

For a better understanding of the nature and objects of the invention, reference should be had to the following detailed description, taken in conjunction with the accompanying drawings, in which like parts are given like reference numerals and the element or portions thereof are lined to indicate the following colors — red, orange, yellow, blue, green, purple and brown — and wherein.

DESCRIPTION OF THE PREFERRED EMBODIMENT

Figure 3:
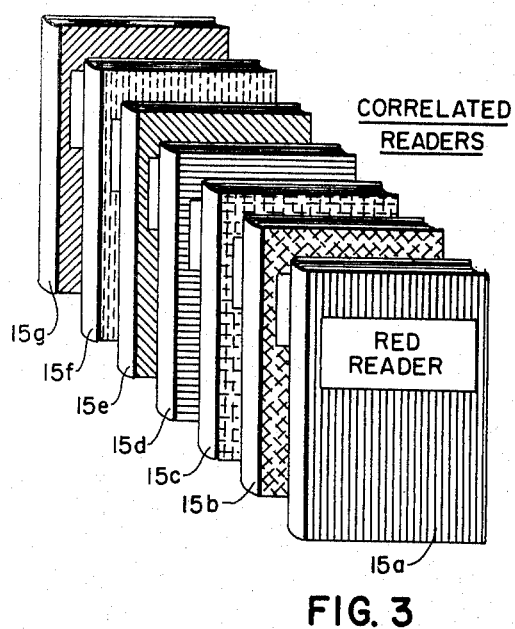
FIG. 3 is a perspective view of the color coded correlated readers which constitute one element of the preferred embodiment of the present invention.
Figure 4:
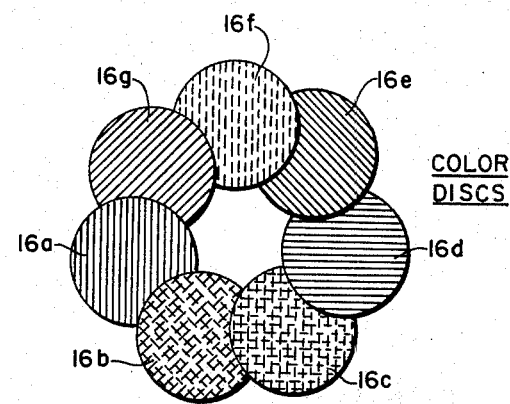
FIG. 4 is a perspective view of the color coded color discs which constitute one element of the preferred embodiment of the present invention.
Figure 1:
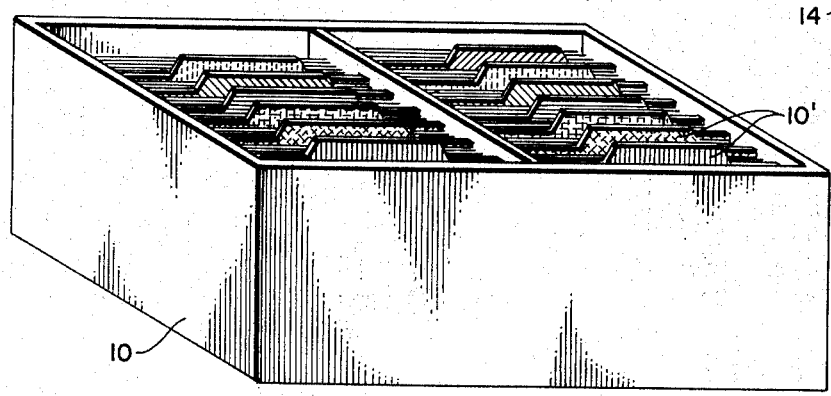
FIG. 1 is a perspective view of a kit containing the elements of the preferred embodiment of the education device of the present invention.
Figure 2:
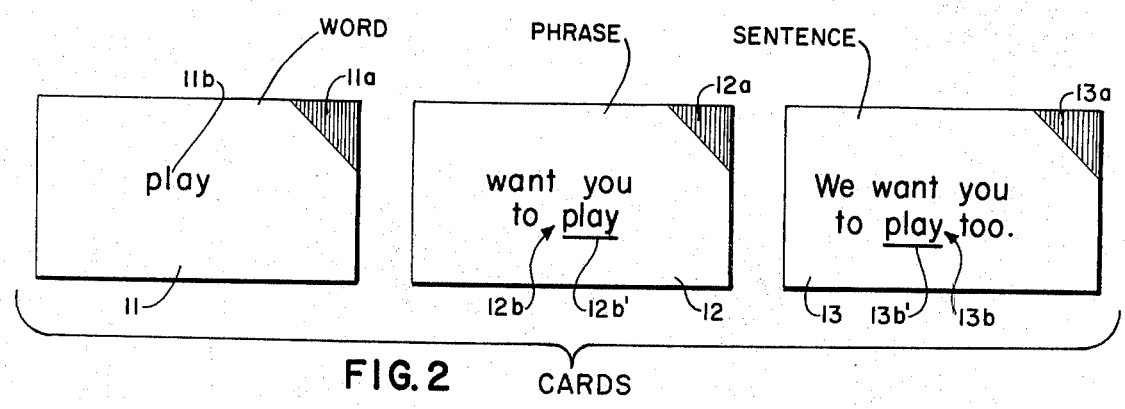
FIG. 2 is a front view of the color coded display cards having "word," "phrase" and "sentence" versions, which constitute key elements of the preferred embodiment of the present invention.

The preferred embodiment of the present invention comprises a color keyed or coded education apparatus or kit 10 (FIG. 1) for teaching a sight vocabulary of functional words including: color display cards 11, 12, 13 (FIG. 2) on which the functional words (e.g. "play" 11b) are color keyed by underlining (note 12b', 13b') or by color printing of the word itself, the color cards being of three types — "word" 11, "phrase" 12, and "sentence" 13 cards; correlated readers 15a-15g (FIG. 3) whose covers are colored in correlation with the color of the words of the color cards 11–13, which are included in the particular reader involved; color coded individual progress charts (not illustrated); and color coded tests (not illustrated) whose color designation again is correlated with the color of the words of the color cards 11-13 which are included in the particular test. The correlating colors of the elements are red, orange, yellow, blue, green, purple and brown, the first six of which are repeated in sets in order to use only those colors which children in big city schools are familiar. Seven color discs 16a-16g (FIG. 4) and crayons 14a-14g (FIG. 5) identical to the colors used in the kit are included for use in teaching initial color concepts when necessary. All elements of the kit are thus color coded or keyed together. The elements of the preferred embodiment have been combined together in a kit 10, with suitable color coded dividers 10', which will be described in greater detail below.

CONTENTS OF THE PREFERRED KIT EMBODIMENT

Figure 5:
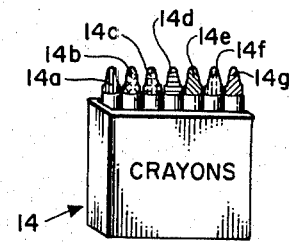
FIG. 5 is a perspective view of the color coded crayons which constitute one element of the preferred embodiment of the present invention.

The preferred embodiment of the present invention comprises a kit 10 (FIG. 1) which contains the following items:

780 Color Cards (FIG. 2);
39 Correlated Readers (3 copies per level) — (FIG. 3);
30 Individual Progress Charts;
1 Teacher's Manual;
390 Color Tests (30 per level); and
7 Crayons (to teach the relevant colors used in the present invention) — (FIG. 5).

The colors used in the present invention are: red, orange, yellow, blue, green, purple, and brown. There are seven colors in all. Six of these colors are repeated in order to use only those colors which children in big city schools use daily.

The kit 10 also contains seven color discs 16a-16g (note FIG. 4) which may be used in teaching initial color concepts where necessary.

There are 13 different color levels in the kit. The first six color levels make up Section A, while Section B is made up of the remaining seven color levels.

Each color level in the kit 10 contains sixty color cards divided by suitable color coded dividers 10' into three parts: twenty word cards 11, twenty phrase cards 12, and twenty sentence cards 13. Each color level contains color tests which should be given before the child moves on to the next color level. The color level of each card can be indicated by a portion thereof, for example triangular section 11a, 12a, 13a, being imprinted with that color. The word 11b, 12b, 13b to be taught in each level is underlined on the phrase and sentence cards 12, 13 (note lines 12b' and 13b', respectively).

The present invention was primarily designed for the teaching of a functional vocabulary of basic words and a list of 260 functional words has been developed by relative levels and are listed below.

LIST OF FUNCTIONAL WORDS BY COLOR LEVELS USED IN PREFERRED EMBODIMENT

Section A

| RED LEVEL | | ORANGE LEVEL | | YELLOW LEVEL | |
|---|---|---|---|---|---|
| I | that | am | them | down | will |
| did | up | get | baby | got | want |
| go | me | have | this | are | us |
| by | look | it | see | an | has |
| and | play | he | little | they | jump |
| do | we | is | him | who | its |
| in | the | away | big | ride | goes |
| said | you | my | be | were | fast |
| a | come | funny | to | your | as |
| find | at | fun | with | mama | if |

| BLUE LEVEL | | GREEN LEVEL | | PURPLE LEVEL | |
|---|---|---|---|---|---|
| all | children | does | house | well | of |
| eat | his | let | under | now | no |
| daddy | put | any | our | must | take |
| both | which | out | for | why | red |
| from | very | how | yes | these | bring |
| but | was | she | car | drink | too |
| good | ran | something | on | many | their |
| make | when | open | so | then | made |
| help | had | saw | keep | came | after |
| her | say | went | may | what | buy |

LIST OF FUNCTIONAL WORDS BY COLOR LEVELS USED IN PREFERRED EMBODIMENT—Continued Section B

| RED LEVEL | | ORANGE LEVEL | | YELLOW LEVEL | |
|---|---|---|---|---|---|
| gave | there | try | found | show | always |
| full | own | draw | eight | brown | know |
| sit | six | sing | start | blue | only |
| just | one | upon | could | been | before |
| every | cut | warm | laugh | better | because |
| ate | far | once | round | tell | give |
| hold | orange | today | about | around | kind |
| not | long | yellow | carry | please | five |
| live | hot | first | green | black | again |
| old | ask | light | cold | hurt | going |

| BLUE LEVEL | | GREEN LEVEL | | PURPLE LEVEL | | BROWN LEVEL | |
|---|---|---|---|---|---|---|---|
| where | pull | ship | walk | mail | might | beautiful | love |
| stop | work | together | wash | man | guess | window | bus |
| those | write | myself | ten | ball | into | school | bird |
| new | two | sleep | three | boat | smile | horse | poor |
| or | pick | thank | clean | clothes | yesterday | young | garden |
| use | small | white | country | chair | plant | read | build |
| some | never | think | off | grow | river | animals | happy |
| soon | call | pretty | room | money | water | farmer | people |
| much | shall | right | bed | dog | friend | remember | table |
| over | would | wish | morning | high | women | thought | food |

The fundamental words are not to be taught in isolation in the use of the present invention but in association with other words in the phrases and sentences. Since individuals are different and learn at different rates, the number of exposures will vary from individual to individual.

The correlated readers 15a-15g (note FIG. 3) correspond with each color level. The red reader 15a contains all words taught at the red level; the green reader 15e contains all words taught at the green level j and so on.

Three copies of each reader 15 are in the kit 10. More copies may be provided if the teacher desires more. The readers were designed to make reading pleasurable and free of anxieties, as no child should reach his frustration level in his attempt to work with the readers.

The correlated readers 15 preferably do not have pictures. This innovation is in keeping with the latest research findings in Beginning Reading. These findings indicate that first graders know how to read pictures and that the task of Beginning Reading instruction is to teach them how to read words. Studies have not shown that pictures actually help children to comprehend meaning and to recognize words. In fact, there is experimental evidence that pictures may actually hinder the child's attempt to build comprehension. Rather than direct the child's attention to pictures, his attention should be directed to words. Too often, the child depends on the pictures to assist him in word recognition. As he moves from words to pictures, back and forth, his comprehension often suffers.

Some authorities suggest that the content of reading materials for young children should be improved. Since folktales along with stories of real people have universal appeal, they preferably are used as content in early readers.

On the basis of these suggestions and in conjunction with other research findings, the content of the correlated readers 15 encompass four groups. The groups are:

I. "Friends About Us"
II. "Fairytale Favorites"
III. "Fables"
IV. "Famous People"

The correlated readers 15 give additional practice in recognition of the color words at each level. Words taught at preceding levels are also repeated throughout the readers for reinforcement.

TEACHING PROCEDURE

The underlined word 12b, 13b on each phrase and sentence card 12, 13 is the word, e.g. "play," to be mastered by the child. The words on the word cards 11 which are used initially are preferrably not underlined (note word 11b).

The present invention can be used with a reading group of a few children or with an individual child.

The following procedure is preferred.

1. The first red word card 11 is shown and the word 11b, e.g., "play," shown thereon stated. The children or child repeat the word. The teacher's finger can be slid under the word 11b from left to right. (The framing method, tracing, matching, and finding can be used whenever possible, after some of the words in a group are known.)

2. The word card 11 is placed on the chalk board ledge or in a suitable pocket chart.

3. The accompanying or corresponding phrase card 12 is shown and the phrase, e.g. "want you to play," is read. The teacher's finger can be slid from left to right and the phrase read again. For emphasis the underlined word 12b is repeated. The phrase can be explained when possible in an effort to stimulate conversation and to clarify meaning and the relationship of the underlined word 12b to the other words in the phrase. The phrase card 12 is then placed next to the word card 11.

4. The above procedures are repeated with the sentence card 13.

5. As many cards or as few as the children can handle are done. Color tests can be administered after the color cards or discs 16a-g are learned.

6. There should be no undue hurrying of the child. Reading should be pleasurable if the child is to make it a lifelong habit.

7. The child is introduced to the correlated reader 15 when he is able to read it with ease. Some vocabulary words taken from the reader may also be presented too if the teacher feels it necessary.

8. The child should color in the correct space on his "Progress Chart."

An individual "Progress Chart" (not illustrated) can be used by the child himself to serve as a record of his reading growth. The child colors in the space which is alloted next to the level which he has completed. Children enjoy doing this.

Suggested activities, games and auxiliary uses for the elements of the present invention are as follows —

1. Two confusing words can be placed one next to the other for making comparisons and distinctions.
2. The children can be allowed to make their own set of color words which can be kept in their own folders and taken home to study the words.
3. The word cards 11 can be appropriately displayed with teams reading each word by sight with the best team winning.
4. The phrase cards 12 can be used to teach the difference between phrase and sentence.
5. A phrase card 12 can be held up with the children making up sentences using the phrase on the card 12.
6. Rhyming words can be found for number of word cards.
7. A pack of word cards can be put in alphabetical order.
8. Tachistoscopes can be made.
9. Word-wheels can be made.
10. Word or phrase meanings can be illustrated.
11. "Opposites" games can be played.
12. "Synonym" games can be played.
13. Creative writing can be done. A short paragraph can be written beginning with the sentence on sentence card. Declarative sentences can be changed to interrogative sentences and vice versa.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A color keyed education apparatus for teaching a sight vocabulary of functional words comprising:
   a plurality of sets of display cards, each set being associated with a different color and representing a differentiated color level group of words, each of said sets including
   a color co-ordinated set of display cards on which the funcational words are printed, the functional words being color keyed on at least some of the cards by underlining or by color printing of the word itself, the display cards being of three types — word, phrase, and sentence cards; the word card of each set having a function word printed thereon and a color associated therewith, the corresponding phrase card having the same word printed thereon used in a phrase and color-keyed to the word card by being underlined or printed in that color, and the corresponding sentence card having the same word printed thereon used in a sentence and color keyed to the word and phrase card by being underlined or printed in that color; whereby the functional words can be easily taught by displaying the word individually, in a phrase and in a sentence, with all the cards being coordinated and keyed together.

2. The education apparatus of claim 1 wherein there is further included correlated readers whose covers are colored in correlation with the color of the words of the display cards which are included in the particular reader involved.

3. The education apparatus of claim 1 wherein there is further included colored cards or discs, one for each of the color levels used, for teaching initial color concepts for the various colors used in the education apparatus.

4. The education apparatus of claim 1 wherein there is further included a set of crayons, one for each of the color levels used, for use by the students in using the education apparatus.

5. The education apparatus of claim 1 wherein a total of seven colors are used, those seven colors being red, orange, yellow, blue, green, purple and brown, the first six being repeated in sets.

* * * * *